United States Patent
Bamba (10) Patent No.: US 9,970,765 B2
(45) Date of Patent: May 15, 2018

(54) INFORMATION PROCESSOR, AND INFORMATION PROCESSING METHOD FOR GUIDING A ROUTE

(71) Applicant: SONY CORPORATION, Tokyo (JP)

(72) Inventor: Syunsuke Bamba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

(21) Appl. No.: 14/412,755

(22) PCT Filed: Jul. 10, 2013

(86) PCT No.: PCT/JP2013/068839
§ 371 (c)(1),
(2) Date: Jan. 5, 2015

(87) PCT Pub. No.: WO2014/034288
PCT Pub. Date: Mar. 6, 2014

(65) Prior Publication Data
US 2015/0160013 A1 Jun. 11, 2015

(30) Foreign Application Priority Data
Aug. 27, 2012 (JP) ................................. 2012-186702

(51) Int. Cl.
*G01C 21/00* (2006.01)
*G01C 21/34* (2006.01)
(52) U.S. Cl.
CPC ......... *G01C 21/00* (2013.01); *G01C 21/3415* (2013.01)

(58) Field of Classification Search
None
See application file for complete search history.

(56) References Cited

U.S. PATENT DOCUMENTS 6,067,502 A * 5/2000 Hayashida ........... G01C 21/367
340/990
6,192,314 B1 * 2/2001 Khavakh ................ G01C 21/34
701/410

(Continued)

FOREIGN PATENT DOCUMENTS

| JP | 11-295095 A | 10/1999 |
|---|---|---|
| JP | 2002-131069 A | 5/2002 |

(Continued)

*Primary Examiner* — Thomas G Black
*Assistant Examiner* — Demetra R Smith-Stewart
(74) *Attorney, Agent, or Firm* — Chip Law Group (57) ABSTRACT

A positional change calculation processing unit and a positioning signal processing unit obtain the current position. Network information indicating information about a route at the time of moving from one point to another point is stored in a storage unit. A navigation processing unit searches for the route to a destination point by using the network information. When the moving route based on the position obtained by the positional change calculation processing unit and the positioning signal processing unit is different from the searched route then the route is re-searched in the search condition according to the moving route. When the user intends to move on a route different from the searched route, the search condition is changed according to the moving route and the route is researched according to the intention of the user and the user is automatically guided.

10 Claims, 5 Drawing Sheets

(56) References Cited

U.S. PATENT DOCUMENTS

| | | | | |
|---|---|---|---|---|
| 7,197,395 | B2* | 3/2007 | Kishigami | G01C 21/3641 340/995.21 |
| 8,200,417 | B2* | 6/2012 | Hamaguchi | 701/424 |
| 8,583,661 | B2* | 11/2013 | Fujii | G01C 21/3484 707/749 |
| 8,909,469 | B2* | 12/2014 | Mizuno et al. | 701/424 |
| 8,958,984 | B2* | 2/2015 | Okude | G01C 21/343 340/995.19 |
| 2004/0215389 | A1* | 10/2004 | Hirose | G01C 21/3461 701/410 |
| 2010/0114471 | A1* | 5/2010 | Sugiyama | G01C 21/3664 701/532 |
| 2010/0332121 | A1* | 12/2010 | Okude | G01C 21/3415 701/533 |
| 2011/0035148 | A1* | 2/2011 | Machino | G01C 21/3415 701/533 |
| 2011/0145290 | A1* | 6/2011 | Fujii | G01C 21/3484 707/780 |
| 2011/0196601 | A1* | 8/2011 | Miura et al. | 701/200 |
| 2013/0035858 | A1* | 2/2013 | Sumizawa | G01C 21/3658 701/533 |
| 2013/0204528 | A1* | 8/2013 | Okude | G08G 1/096822 701/533 |
| 2013/0226455 | A1* | 8/2013 | Hayashida | G08G 1/096844 701/533 |
| 2014/0046585 | A1* | 2/2014 | Morris, IV | G01C 21/00 701/468 |

FOREIGN PATENT DOCUMENTS

| | | |
|---|---|---|
| JP | 2008-139081 A | 6/2008 |
| JP | 2009-085612 A | 4/2009 |
| JP | 2011-058899 A | 3/2011 |

\* cited by examiner

| TRANSPORTATION MODE | TOLL ROAD PRIORITY | GENERAL ROAD PRIORITY | HIGHWAY PRIORITY | BACK ROAD PRIORITY | NARROW ROAD PRIORITY | DISTANCE PRIORITY | SLOPE PRIORITY | FEW SLOPES | ROAD THAT IS USUALLY USED | ROAD THAT IS NOT USUALLY USED | EXISTENCE/NON-EXISTENCE OF PUBLIC TRANSPORTATION | EXISTENCE/NON-EXISTENCE OF SEA ROUTE | CYCLETRACK PRIORITY |
|---|---|---|---|---|---|---|---|---|---|---|---|---|---|
| AUTOMOBILE | ○ | ○ | ○ | ○ | ○ | ○ | × | × | ○ | ○ | × | ○ | × |
| BIKE | ○ | ○ | ○ | ○ | ○ | ○ | ○ | ○ | ○ | ○ | × | ○ | × |
| BICYCLE | × | × | ○ | ○ | ○ | ○ | ○ | ○ | ○ | ○ | ○ | ○ | ○ |
| WALK | × | × | ○ | ○ | ○ | ○ | ○ | ○ | ○ | ○ | ○ | ○ | × |
| JOG | × | × | ○ | ○ | ○ | ○ | ○ | ○ | ○ | ○ | × | × | × |

FIG. 5

INFORMATION PROCESSOR, AND INFORMATION PROCESSING METHOD FOR GUIDING A ROUTE

TECHNICAL FIELD

The technique relates to an information processor, an information processing method, and a program and can automatically guide a route having characteristics that a user intends.

BACKGROUND ART

Conventionally, a navigation apparatus for guiding a route to a destination has been widely used. For example, in a case where the navigation apparatus has detected a traffic jam on the route to be driven when the route is guided, there is a technique for re-searching and indicating a new route which avoids the traffic jam in Patent Document 1. Also, when the user drives an area, where the user knows well about a road condition, such as an area around user's house, it is possible that the indication of the new route is not necessary for the user. Therefore, in Patent Document 2, the indication of the new route is limited, for example, when the user can find a way to avoid the traffic jam without the indication of the new route.

CITATION LIST

Patent Document

Patent Document 1: JP 2008-139081 A
Patent Document 2: JP 2011-58899 A

SUMMARY OF THE INVENTION

Problems to be Solved by the Invention

According to the route search by a normal navigation apparatus, the characteristics of a route to be searched are different according to a search condition. Also, since the route is searched in a search condition, which has been previously set, at the time of re-search, the characteristics of the route do not change. Therefore, when the route is re-searched in a case where the user had taken a wrong route, the route is appropriately guided. However, there is a case where the user consciously drives a different route from the guided route. In this case, there is a possibility that the searched route is guided, for example, every time when the user approaches junctions and the user has an unpleasant feeling.

Also, the user can manually change the search condition. However, the user cannot change the search condition only after the user has stopped once and unlocked an operation lock of the navigation apparatus. Therefore, the user has to perform a complicated change operation of the search condition in order to search for the route corresponding to the route where the user drives. It is not easy to search for the route corresponding to the route where the user drives.

According to the technique, there are provided an information processor, an information processing method, and a program which can automatically guide a route according to an intention of a user.

Solutions to Problems

A first aspect of the technique is an information processor including a route search unit configured to search for a route to a destination point by using network information in which information on the route in a case where a user moves from a point to another point has been indicated and a position obtaining unit configured to obtain a current position. The route search unit re-searches for the route in a search condition according to a moving route when the moving route based on a position obtained by the position obtaining unit is different from a searched route and another route is re-searched.

According to the technique, the route to the destination point is searched by using the network information in which the information on the route in a case where the user moves from the point to the another point has been indicated. Also, when the moving route based on the position obtained by the position obtaining unit is different from the searched route and the another route is re-searched, it is determined whether it is necessary to change of the search condition, for example, by using an evaluation value calculated for the search condition relative to the searched route and an evaluation value calculated for the search condition which has been previously provided or by using a frequency of re-search. Here, when it has been determined that it is necessary to change the search condition, the search condition is changed to that according to the moving route, and the route is re-searched. For example, the evaluation value regarding the moving route for each search condition which has been previously provided is calculated, and the search condition according to the moving route is determined based on the calculated evaluation value. The evaluation value is calculated, for example, by using a goodness of fit of the search condition relative to the searched route, a goodness of fit of the search condition which has been previously provided, the frequency of the re-search, and learning data of the re-search. Also, the route is re-searched by adding the search condition relative to the searched route to the search condition according to the moving route. Then, the weight of the search condition according to the moving route can be sequentially increased according to that the user continues to move on the route searched in the search condition according to the moving route.

A second aspect of the technique is an information processing method which includes a process for searching for a route to a destination point by using network information in which information on the route in a case where a user moves from a point to another point has been indicated, a process for obtaining a current position, and a process for re-searching for the route in a search condition according to a moving route when the moving route based on the obtained position is different from the searched route and another route is re-searched.

A third aspect of the technique is a program which makes a computer executes a navigation function and makes the computer execute a procedure for searching the a route to a destination point by using network information in which information on the route in a case where a user moves from a point to another point has been indicated, a procedure for obtaining a current position, and a procedure for re-searching for the route in a search condition according to a moving route when the moving route based on the obtained position is different from the searched route and another route is re-searched.

The program of the present technique can be provided by storage media for providing in a computer-readable form, such as an optical disk, a magnetic disk, and a semiconductor memory and communication media such as a network relative to, for example, a general-purpose computer which can execute various programs and codes. The computer can realize processing according to the program by providing these programs in a computer-readable form.

Effects of the Invention

According to the technique, the route to the destination point is searched by using the network information in which the information on the route in a case where the user moves from the point to the another point has been indicated. Also, when the moving route is different from the searched route and the route is re-searched, the route is re-searched in a search condition according to the moving route. Therefore, since the re-search is performed in the search condition according to the route that the user intends when the user has consciously moved on the route different from the guided route, the route according to the intention of the user can be automatically guided. Also, the number of times of the re-search can be reduced because the route is guided according to the intention of the user. The effects described herein are only exemplary and not limited to these. Also, there may be an additional effect.

MODE FOR CARRYING OUT THE INVENTION

Figure 1:
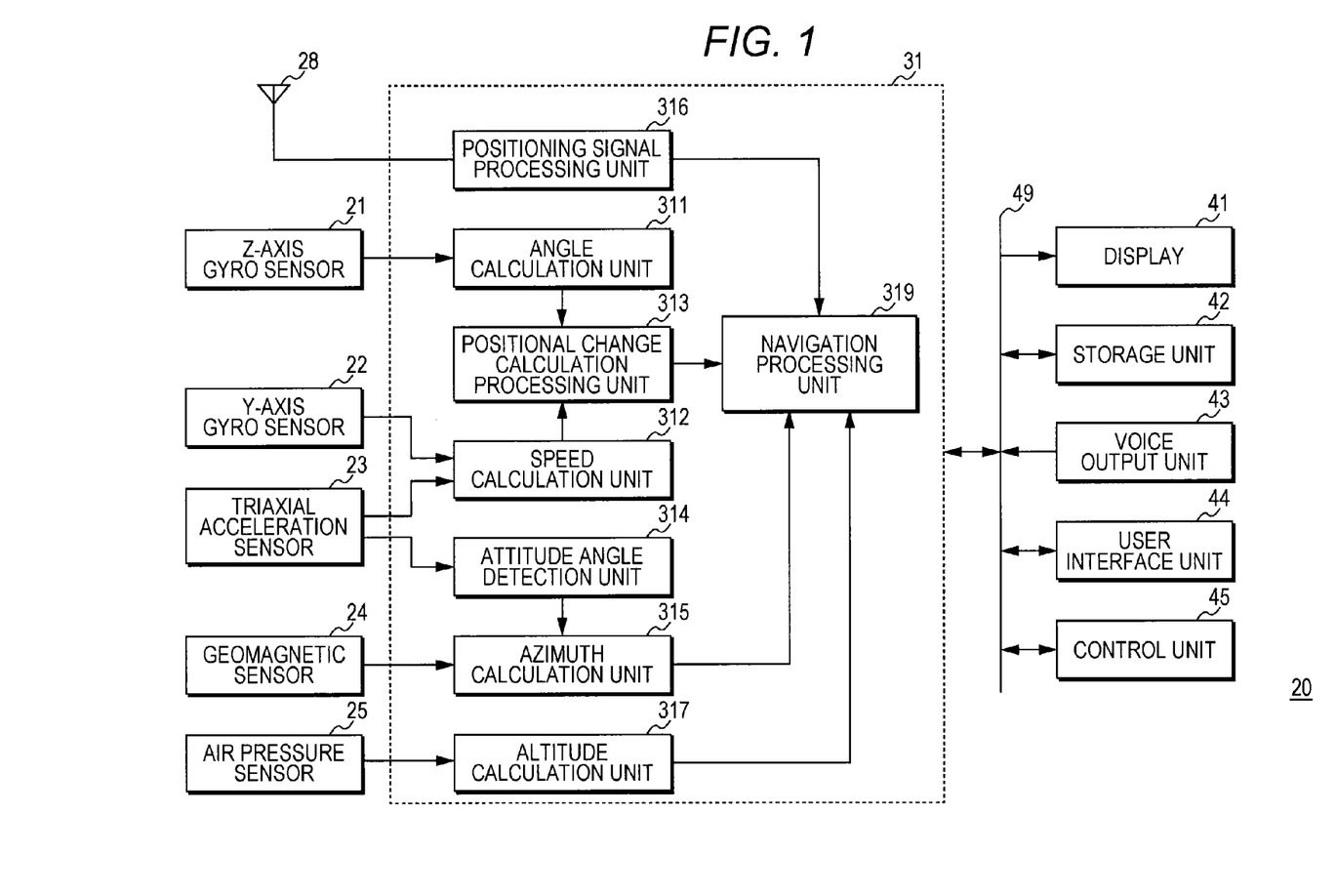
FIG. 1 is a diagram of an exemplary structure of a navigation function of an information processor.

Embodiments for carrying out the present technique will be described below. The description will be in the following order.
1. Structure of information processor
2. Operation of information processor
3. Change processing operation of search condition
3-1. First change processing operation of search condition
3-2. Second change processing operation of search condition
3-3. Third change processing operation of search condition
3-4. Other change processing operation of search condition
<1. Structure of Information Processor>
An information processor 20 includes a function for displaying a current position on a map, a navigation function for guiding a route to a destination, and the like. FIG. 1 is an exemplary structure of the navigation function of the information processor 20.

The information processor 20 includes a Z-axis gyro sensor 21, a Y-axis gyro sensor 22, a triaxial acceleration sensor 23, a geomagnetic sensor 24, an air pressure sensor 25, and an antenna 28. Also, the information processor 20 includes a navigation unit 31, a display 41, a storage unit 42, a voice output unit 43, a user interface unit 44, and a control unit 45. In addition, the navigation unit 31 includes an angle calculation unit 311, a speed calculation unit 312, a positional change calculation processing unit 313, an attitude angle detection unit 314, an azimuth calculation unit 315, a positioning signal processing unit 316, an altitude calculation unit 317, and a navigation processing unit 319. The navigation unit 31 is connected to the display 41, the storage unit 42, the voice output unit 43, the user interface unit 44, and the control unit 45 via a bus 49.

Figure 2:
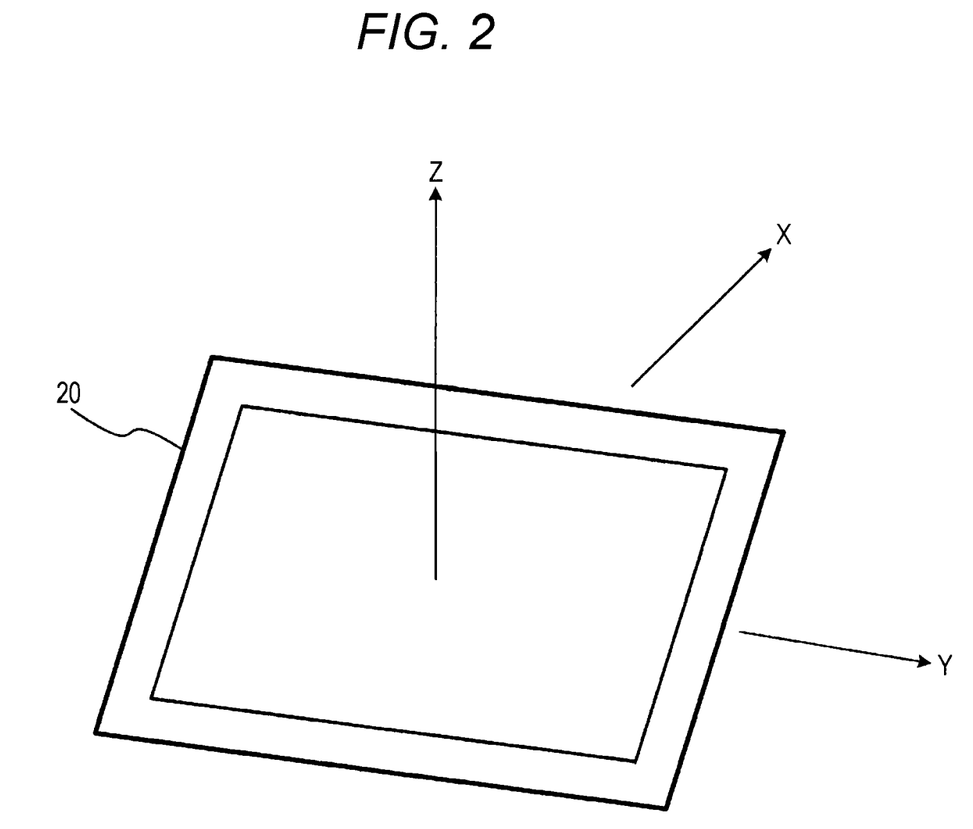
FIG. 2 is a relationship diagram of an axis and a direction of a Z-axis gyro sensor.

The Z-axis gyro sensor 21 detects a yawing which is the movement around a Z-axis. The Z-axis gyro sensor 21 detects a yaw rate Rz, for example, at a sampling frequency of 50 Hz. The yaw rate Rz is a speed (angular velocity) of the change of a rotation angle around the Z-axis in a case where the information processor 20 turns around the Z-axis. The Z-axis gyro sensor 21 outputs a detection signal indicating the detected yaw rate to the angle calculation unit 311 of the navigation unit 31. The Z-axis corresponds to a vertical direction as illustrated in FIG. 2. An X-axis corresponds to an advancing direction of the information processor 20, and a Y-axis corresponds to a horizontal direction perpendicular to the X-axis.

The angle calculation unit 311 calculates an angle, in a case where the information processor 20 turns, by integrating the yaw rate Rz input from the Z-axis gyro sensor 21 with a sampling period. Then, the angle calculation unit 311 outputs angle data indicating the calculated angle to the positional change calculation processing unit 313.

The Y-axis gyro sensor 22 detects a pitching which is the movement around the Y-axis. The Y-axis gyro sensor 22 detects a pitch rate Ry which is an angular velocity around the Y-axis, for example, at the sampling frequency of 50 Hz and outputs a detection signal indicating the detected pitch rate to the speed calculation unit 312 of the navigation unit 31.

The triaxial acceleration sensor 23 detects an acceleration Ax along the X-axis, an acceleration Ay along the Y-axis, and an acceleration Az along the Z-axis. The triaxial acceleration sensor 23 detects the acceleration Ax, the acceleration Ay, and the acceleration Az, for example, at the sampling frequency of 50 Hz and inputs a detection signal indicating the detected acceleration to the speed calculation unit 312 and the attitude angle detection unit 314 of the navigation unit 31.

The speed calculation unit 312 calculates a speed V relative to the advancing direction by dividing the acceleration Az along the Z-axis supplied from the triaxial acceleration sensor 23 by the pitch rate Ry supplied from the Y-axis gyro sensor 22. The speed calculation unit 312 outputs speed data indicating the calculated speed to the positional change calculation processing unit 313.

The positional change calculation processing unit 313 calculates an amount of positional change based on the speed calculated by the speed calculation unit 312 and the angle calculated by the angle calculation unit 311. Specifically, the positional change calculation processing unit 313 obtains the amount of the positional change from the position at the time of the previous calculation to the current position based on the speed and the angle. The positional change calculation processing unit 313 adds the amount of the positional change to the position of the previous time and calculates the current position. After that, the positional change calculation processing unit 313 supplies position information indicating the calculated current position to the navigation processing unit 319.

By performing predetermined attitude angle detection processing based on the detection signal supplied from the triaxial acceleration sensor 23, the attitude angle detection unit 314 generates attitude angle data indicating the attitude angle of the information processor 20 and outputs the data to the azimuth calculation unit 315.

The geomagnetic sensor 24 detects magnetism of the earth in an X-axis direction, a Y-axis direction, and a Z-axis direction and outputs data of the magnetism of the earth indicating the detected result to the azimuth calculation unit 315 of the navigation unit 31.

The azimuth calculation unit 315 performs predetermined correction processing relative to the data of the magnetism of the earth supplied from the geomagnetic sensor 24 and generates azimuth data indicating azimuth direction of the information processor 20 based on the corrected data of the magnetism of the earth and the attitude angle data supplied from the attitude angle detection unit 314. The azimuth calculation unit 315 outputs the generated azimuth data to the navigation processing unit 319.

That is, the triaxial acceleration sensor 23, the geomagnetic sensor 24, the attitude angle detection unit 314, and the azimuth calculation unit 315 function as a so-called electronic compass and generate the azimuth data. Therefore, as will be described below, the navigation processing unit 319 can provide map data to the user. The map data is displayed corresponding to the direction of the information processor 20 by using the azimuth data.

For example, the antenna 28 receives positioning signals from a plurality of positioning satellites and outputs a reception signal to the positioning signal processing unit 316 of the navigation unit 31. The positioning signal to be received includes information such as orbit data indicating an orbit of the positioning satellite and a transmission time of the signal.

The positioning signal processing unit 316 calculates the position of each positioning satellite based on the orbit data obtained by demodulating the reception signal supplied from the antenna 28 and calculates a distance between each positioning satellite and the information processor 20 based on a difference between the transmission time and a reception time of the positioning signal. The positioning signal processing unit 316 calculates a current three-dimensional position based on the calculated position of each positioning satellite and the calculated distance between each positioning satellite and the information processor 20. The positioning signal processing unit 316 generates current position data indicating the calculated three-dimensional position and outputs it to the navigation processing unit 319.

The air pressure sensor 25 is a sensor for detecting an ambient atmosphere pressure. The air pressure sensor 25 detects an atmosphere pressure at the sampling frequency of, for example, 50 Hz and outputs the detected atmosphere pressure data to the altitude calculation unit 317 of the navigation unit 31.

The altitude calculation unit 317 calculates an altitude of the information processor 20 based on the atmosphere pressure data supplied from the air pressure sensor 25 and supplies altitude data indicating the calculated altitude to the navigation processing unit 319 of the navigation unit 31.

The navigation processing unit 319 obtains the position information indicating the calculated current position from the positional change calculation processing unit 313 or the positioning signal processing unit 316. Also, the navigation processing unit 319 obtains the azimuth direction, to which the information processor 20 is directed, from the azimuth calculation unit 315 and the altitude of the information processor 20 from the altitude calculation unit 317. That is, the navigation processing unit 319 includes a relative position acquisition function by using various sensors in addition to an absolute position acquisition function. The information regarding the relative position may be used in a situation that the information processor 20 exists in a position where the absolute position cannot be obtained, that is, where the positioning signal cannot be received. The information regarding the relative position may be used together with the information regarding the absolute position. Also, the navigation processing unit 319 may use a method for obtaining the position information by using a wireless local area network (LAN) and the like. For example, the position of the information processor 20 may be estimated based on the position information of each base station (access point) which has been previously registered and signal strength of a wireless signal from each base station.

Also, the navigation processing unit 319 reads the map data of a region around and including the current position from the storage unit 42 and generates a map image including the current position and corresponding to the current azimuth of the information processor 20 based on the azimuth data. The navigation processing unit 319 displays the map image by outputting the generated map image data to the display 41. The navigation processing unit 319 can use the obtained information regarding the position as it is. However, various corrections can be performed to the information. For example, map matching processing is exemplified as a typical example of correction processing. The map matching processing is a method for using map information in order to correct an error of the position information. By performing the map matching processing, the road on the map is searched according to a change of the position information, and correct position information is estimated. Accordingly, the position information is corrected based on this estimation.

In addition, the navigation processing unit 319 has a function as a route search unit. The navigation processing unit 319 searches for the route to the destination point by using the network information, which has stored in the storage unit 42, to be described below based on the search condition selected by the user and the like. The navigation processing unit 319 guides the route so that the user moves along the searched route based on the search result of the route and the current position calculated by the positional change calculation processing unit 313 or the positioning signal processing unit 316. For example, the navigation processing unit 319 outputs a display indicating the route on a screen of the display 41 and the voice for instructing the route from the voice output unit 43. Also, the navigation processing unit 319 re-searches for the route in the search condition according to the moving route in a case where the moving route based on the calculated position is different from the searched route and the route is re-searched.

The display 41 is a display device for outputting a screen display. For example, information indicating the current position, the route searched in the desired search condition, and the like are superimposed on the map data on the screen display. Also, the display 41 displays a menu to select functions of the information processor 20 and perform various settings. The display 41 includes a display device such as a liquid crystal display (LCD) and an organic Electroluminescence (EL) display.

The storage unit 42 is storage media for storing a program to operate the information processor 20, the network information indicating the information on the route in a case where the user moves the point to another point, the map data, and the like. The storage unit 42 may be storage media, for example, a non-volatile memory such as a flash ROM (flash memory), an electrically erasable programmable read-only memory (EEPROM) and Erasable Programmable ROM (EPROM), a magnetic disk such as a hard disk and a disk-shaped magnetic disk, an optical disk such as a compact disc (CD), a digital versatile disc recordable (DVD-R) and a Blu-ray Disc (BD (registered trademark)), and a magneto optical (MO) disk.

The network information stored in the storage unit 42 includes node data and link data. The node data is information regarding a specific spot and point (hereinafter referred to as a node) which is a riding point, a transfer point, and the like at the time of using the transportation mode. The node data is data regarding the points, for example, a start point and an end point of the road, an intersection of roads, a corner of the road, a start point and an end point of a sidewalk, a connection point of the sidewalk, and a corner of the sidewalk. The node data specifically includes data such as a node ID, latitude and longitude information, a connection link ID and the like. The node ID is a number uniquely assigned for each node. The latitude and longitude information is information which illustrates the current position of the node by the latitude and longitude. The connection link ID is information for identifying the link connected to the node.

The link data is information indicating connection relation (link) of the route between the nodes and the like. For example, the link data is data regarding a road, where a person and vehicle go through, such as the road from the intersection to the intersection, the road from the corner to the next intersection, the sidewalk, and a crosswalk. The node data includes data such as a link ID, a link shape, a link distance, a link moving time, and a link attribute. The link ID is a number uniquely assigned for each link. The link shape indicates a shape in a case where the link is drawn together with the map image. The link distance indicates a distance between the nodes. The link moving time indicates time necessary for moving on the link. The link attribute indicates an attribute such as a grade, a width of a road, and the like of the link.

The voice output unit 43 is an output device for outputting voice data and includes a speaker, for example. The voice output unit 43 outputs, for example, a guidance about the searched route. The user can find the route to advance by listening to the guidance even when the user does not view the display 41.

The user interface unit 44 includes an operation switch, an operation button, a touch screen which is integrally provided on the screen of the display 41, and the like. The user interface unit 44 receives an operation instruction by the user and outputs an operation signal indicating a content of the operation to the control unit 45. For example, to set the destination, to enlarge/reduce the size of the map, to set the voice guidance, and to set the screen display can be exemplified as the operation instruction by the user.

The control unit 45 includes a central processing unit (CPU), a read only memory (ROM), a random access memory (RAM), and the like. The CPU operates the information processor 20 according to a user operation by executing a program stored in the ROM or the storage unit 42 and controlling the operation of each unit based on the operation signal from the user interface unit 44.

<2. Operation of Information Processor>

Figure 3:
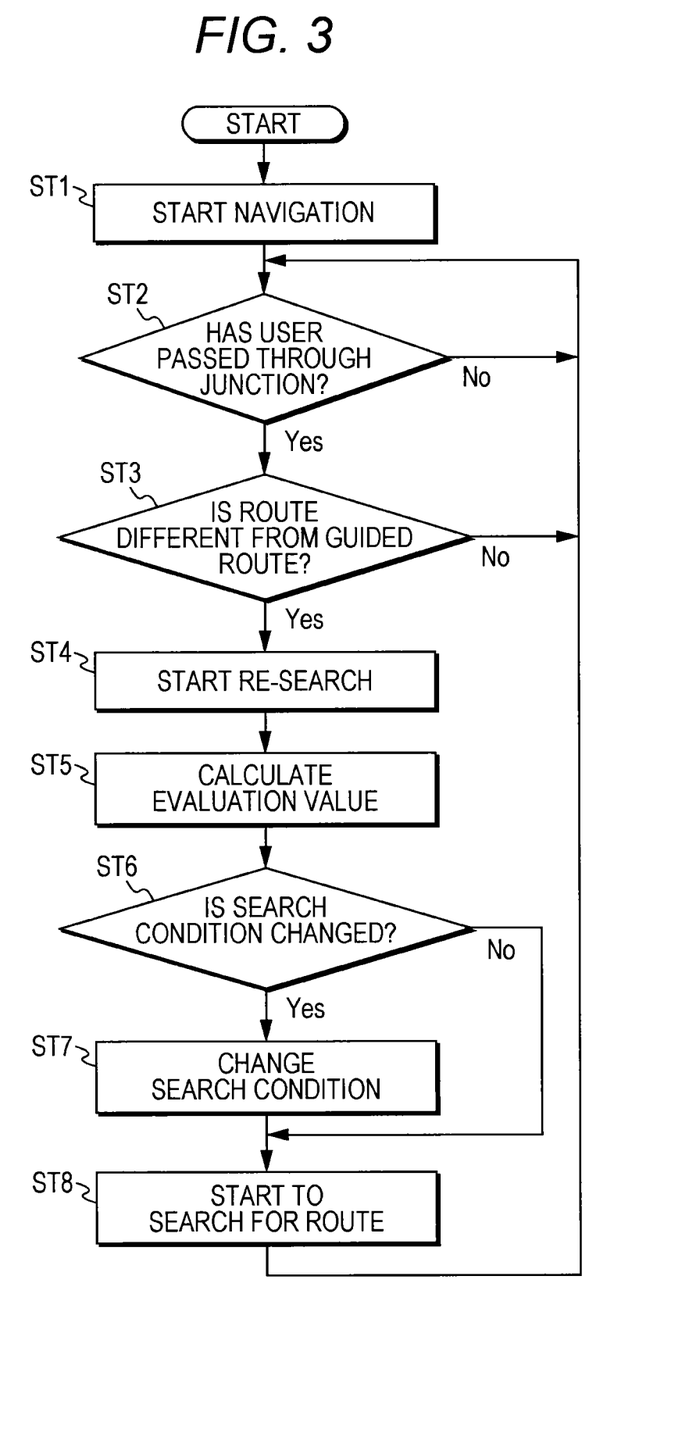
FIG. 3 is a flowchart of apart of an operation performed by a navigation processing unit.

Next, the operation of the information processor will be described. FIG. 3 is a flowchart of apart of an operation performed by the navigation processing unit 319 of the information processor 20.

The navigation processing unit 319 starts navigation in step ST1. The navigation processing unit 319 searches for the route to the destination point, for example, in the search condition selected by the user and the like and starts the navigation based on the search result. Then, the flow proceeds to step ST2.

The navigation processing unit 319 determines in step ST2 whether the user has passed through the junction. The navigation processing unit 319 determines whether the user has passed through the junction (for example, an intersection) based on the position calculated by the positional change calculation processing unit 313 or the positioning signal processing unit 316 and the information about the searched route. When the navigation processing unit 319 determines that the user has not passed through the junction, the flow returns to step ST2. When the navigation processing unit 319 determines that the user has passed through the junction, the flow proceeds to step ST3.

The navigation processing unit 319 determines in step ST3 whether the route is different from the guidance. The navigation processing unit 319 determines whether the route after passing through the junction is different from the guided route, that is, the searched route. When the navigation processing unit 319 determines that the route after passing through the junction is the guided route, that is, the moving route of the user which is the route after passing through the junction coincides with the searched route, the flow returns to step ST2. When the route after passing through the junction is different from the guided route, the flow proceeds to step ST4.

The navigation processing unit 319 starts the re-search (rerouting) in step ST4. Since the moving route is different from the searched route, the navigation processing unit 319 starts to re-search for the route, and the flow proceeds to step ST5.

The navigation processing unit 319 calculates an evaluation value in step ST5. The navigation processing unit 319 calculates the evaluation value for each search condition, and the flow proceeds to step ST6. The evaluation value is used to determine whether it is necessary to change the search condition and determine the kind of the search condition when the search condition is changed.

The navigation processing unit 319 determines in step ST6 whether to change the search condition. When the navigation processing unit 319 has determined that it is necessary to change the search condition based on the evaluation value or a frequency of the re-search, the flow proceeds to step ST7. When the navigation processing unit 319 has determined that it is not necessary to change the search condition, the flow proceeds to step ST8.

The navigation processing unit 319 changes the search condition in step ST7. The navigation processing unit 319 selects the search condition after the change based on the evaluation value calculated in step ST5, and the flow proceeds to step ST8.

The navigation processing unit 319 starts to search for the route in step ST8. The navigation processing unit 319 searches for the route from the current position to the destination point based on the search condition. Also, when the search condition has changed in step ST7, the navigation processing unit 319 searches for the route in the search condition after the change. In addition, the navigation processing unit 319 starts to guide based on the route search result, and the flow returns to step ST2.

<3. Change Processing Operation of Search Condition>

Next, a change processing operation of the search condition will be described. The navigation processing unit 319 calculates the evaluation value for each search condition corresponding to the transportation mode of the user. When it is determined whether it is necessary to change the search condition based on the evaluation value and when the search condition is changed, the navigation processing unit 319 determines the kind of the search condition to be changed.

Figure 4:
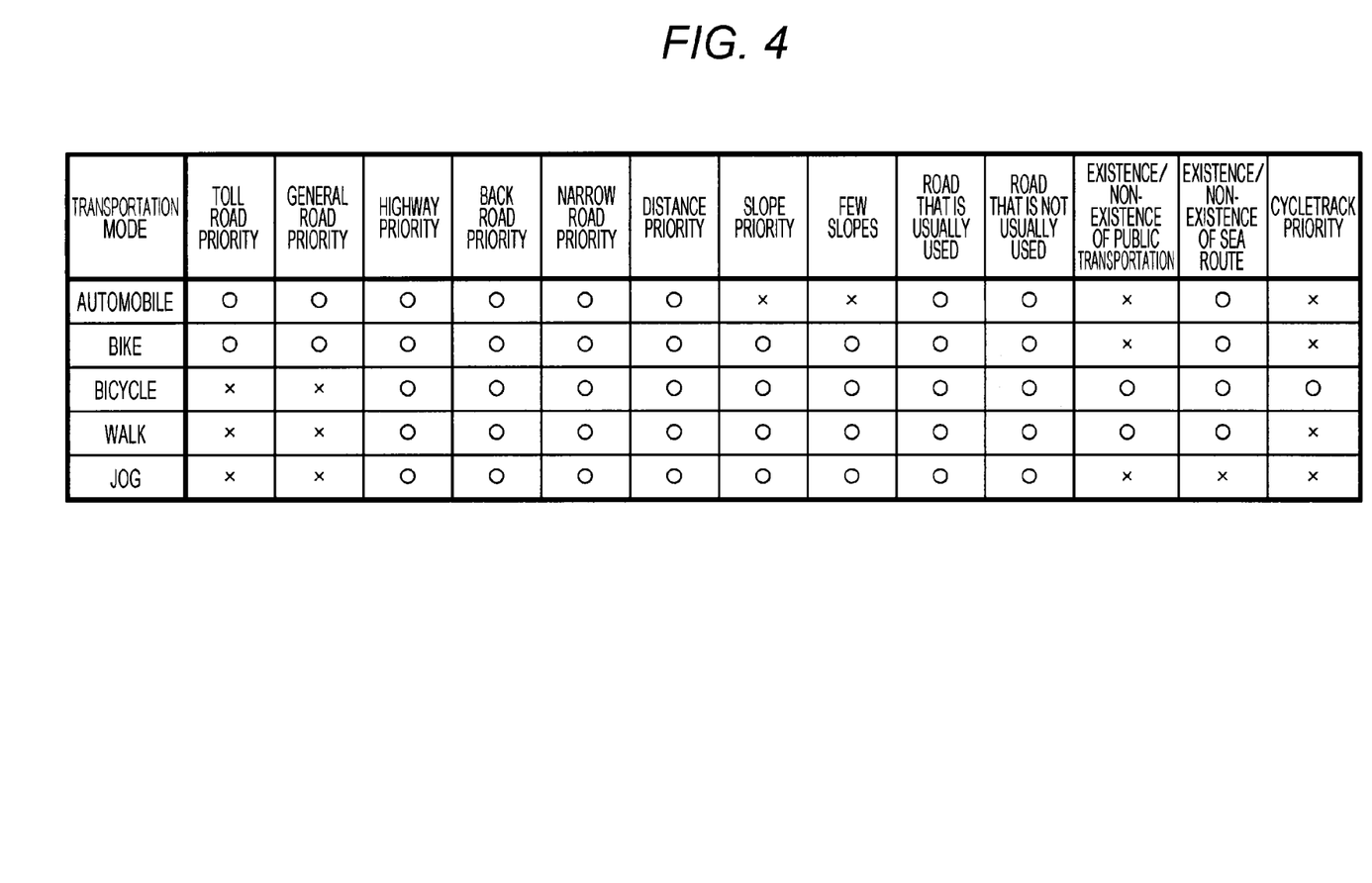
FIG. 4 is a chart of exemplary search conditions for each transportation mode.

FIG. 4 is exemplary search conditions for each transportation mode. As a transportation mode, "automobile", "bike", "bicycle", "walk", and "jog" are exemplified in FIG. 4. Also, as the search condition, a case is exemplified where the conditions such as "toll road priority", "general road priority", "highway priority", "back road priority", "narrow road priority", "distance priority", "slope priority", "few slopes", "road that is usually used", "road that is not usually used", "existence/non-existence of public transportation", "existence/non-existence of sea route", and "cycletrack priority" are provided.

Also, in FIG. 4, circles indicate the search condition to be changed, and crosses indicate the search condition not to be changed. For example, when the transportation mode is "automobile", "slope priority", "few slopes", and "existence/non-existence of public transportation" are not included in the search condition to be changed. However, when the transportation mode is "bicycle", the conditions above are included in the search condition to be changed, and "toll road priority" and "general road priority" are not included in the search condition to be changed.

<3-1. First Change Processing Operation of Search Condition>

In a first change processing operation of the search condition, the selection of the search condition will be described in a case where an evaluation value W is calculated by using a goodness of fit for each search condition relative to the transportation mode of the user and it is determined whether to change the search condition based on the evaluation value W and the search condition is changed.

The goodness of fit is determined based on the link data and the search condition corresponding to the transportation mode of the user. For example, when the link attribute of the link data satisfies the search condition, the goodness of fit becomes larger than that in a case where the link attribute does not satisfy the search condition. Specifically, the network information indicating the route after passing through the junction indicates that, for example, the route is a wide highway. In this case, it is assumed that the goodness of fit be "S=Ma" when the search condition is "highway priority", and the goodness of fit is set to be "S=Mb (<Ma)" when the search condition is the "general road priority". The goodness of fit S set in this way is used as the evaluation value. Also, the evaluation value may be calculated based on the goodness of fit of the search condition relative to the searched route and the goodness of fit of the search condition which has been previously provided for the moving route. For example, a proportion of the goodness of fit of the search condition of the change candidate relative to that of the searched route may be the evaluation value. Specifically, it is assumed that the evaluation value be "Ma/Mb" when the route is searched and guided in the search condition of "general road priority" and the search condition of the change candidate is "highway priority".

The navigation processing unit 319 changes the search condition and selects the search condition after the change based on the evaluation value W. The navigation processing unit 319 changes the search condition when a value of the goodness of fit of the search condition of the change candidate is larger than that of the search condition of the searched route. Also, the search condition may be changed when a proportion of the goodness of fit of the search condition of the change candidate relative to that of the search condition of the searched route is larger than a predetermined proportion (for example, "one") and when the value of the goodness of fit of the search condition of the change candidate is larger than a threshold. In addition, when the search condition is changed, the search condition having the largest value of the goodness of fit and the search condition having the largest proportion are selected, and the route is re-searched in the selected search condition.

For example, when a road of the moving route is a general road and the search condition of the searched route is "highway priority", the goodness of fit of the search condition of "general road priority" is higher than that of the search condition of "highway priority". That is, the evaluation value of the search condition of "general road priority" is higher than that of the search condition of "highway priority". Therefore, in a case where the road of the moving route is the general road at the time of re-searching, "general road priority" is more likely to be selected than "highway priority" as the search condition.

Also, when a difference between the goodnesses of fit is generated according to the difference between the attributes of the routes based on the search condition, the difference between the goodnesses of fit becomes larger in a case where the difference between the attributes, such as a difference between "general road" and "toll road", is large. Accordingly, it becomes easy to select the route according to the intention of the user.

When this change processing operation is performed, the search condition which is mostly fit to the moving route is selected in a case where the user has selected and moved on the route different from the searched route, and the route is re-searched in the selected search condition.

Figure 5:
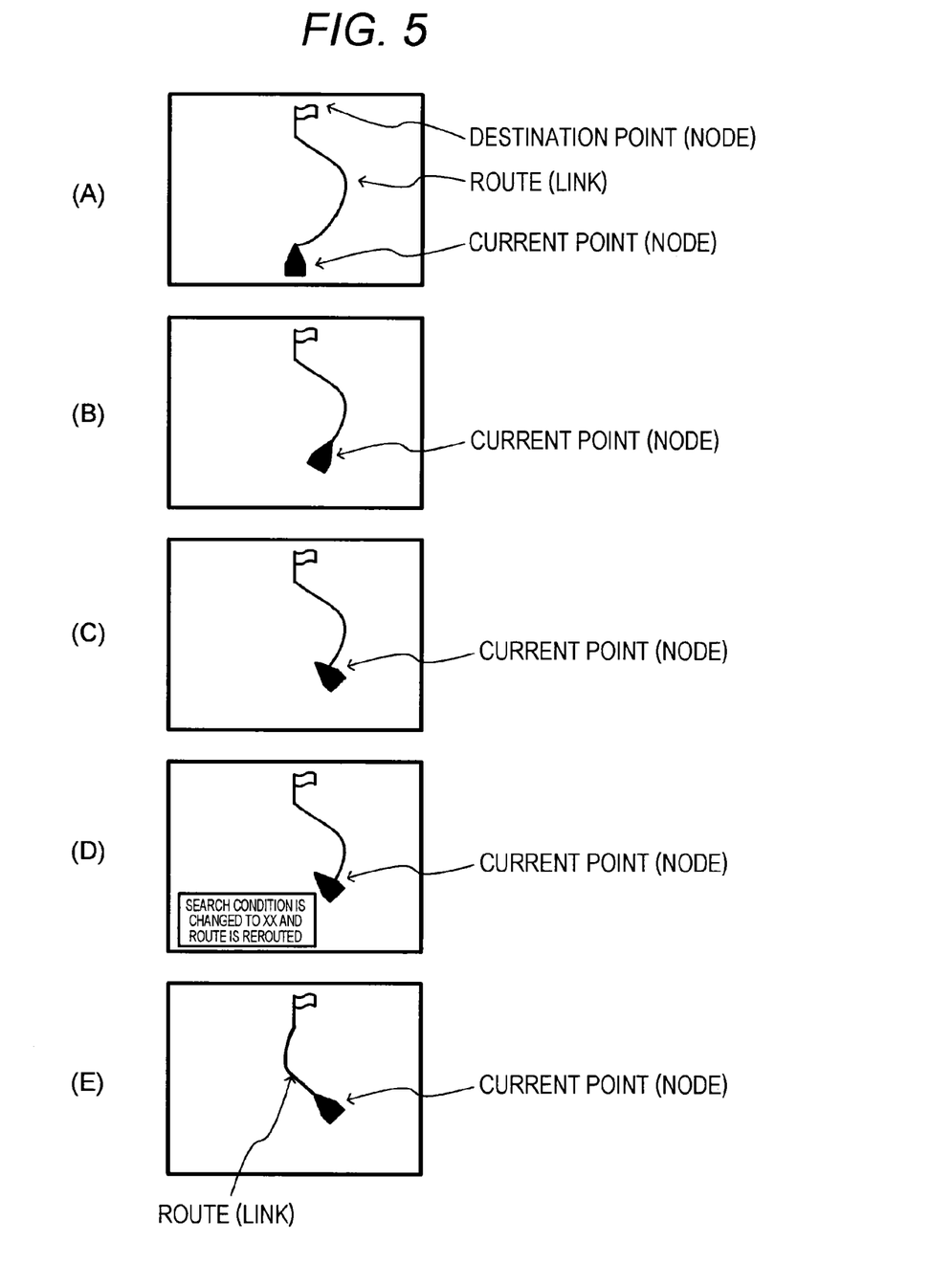
FIGS. 5(A) to 5(E) are diagrams of exemplary displays of a searched route.

FIGS. 5(A) to 5(E) are exemplary displays of the searched route on the display 41. FIG. 5(A) is the node indicating the destination point and the current position of the user and the link indicating the route searched based on the selected search information.

FIG. 5(B) is a state where the user is moving on the searched route. When the user moves on the searched route, a marker indicating the current position moves on the searched route on the display 41 according to the movement of the user.

FIG. 5(C) is a state where the user moves on the route different from the searched route. Since the user moves on the route different from the searched route, a direction of the marker indicating the current position is changed to a direction of the route different from the searched route on the display 41.

FIG. 5(D) is a state where re-searching for the route is started and the change of the search condition is notified to the user. When the user moves on the route different from the searched route and the search condition is changed and re-searching for the route is started, the display 41 displays that the search condition is changed and the route is re-searched.

FIG. 5(E) is a newly searched route by re-searching for the route. When the new route is searched by re-searching for the route, the display 41 displays the new route from the current position to the destination point.

As described above, the search condition which is mostly fit to the moving route is selected in a case where the user has selected and moved on the route different from the searched route, and the route is re-searched in the selected search condition. Then, the newly searched route is guided. Therefore, the route according to the intention of the user can be automatically guided.

<3-2. Second Change Processing Operation of Search Condition>

In a second change processing operation of the search condition, the selection of the search condition will be described in a case where an evaluation value is calculated by using a goodness of fit S for each search condition relative to the transportation mode of the user and a frequency T of the re-search and it is determined whether to change the search condition based on the evaluation value and the search condition is changed.

The frequency T of the re-search is set to become larger when the user has selected the route different from the searched route in a short section. For example, it is assumed that the frequency T of the re-search is the number of times of re-search per the predetermined time or the number of times of re-search continuously performed. Also, the weighting is performed on the additional value and multiplied value of the number of times of re-search per the predetermined time and the number of times of the re-search which has been performed or the number of times of re-search per the predetermined time and the number of times of the re-search which has been performed, and it may be assumed that the frequency T of the re-search be the additional value and multiplied value of the number of times after the weighting.

The navigation processing unit 319 calculates an evaluation value Wj according to the function f based on the formula (1) by using the goodness of fit S of the search condition and the frequency T of the re-search.

$$Wj=f(Sij,T) \quad (1)$$

In the formula (1), the letter "i" is an index corresponding to the search condition of the searched route. The letter "j" is an index corresponding to the search condition of the change candidate. Also, a goodness of fit Sij indicates the proportion of the goodness of fit of the search condition (index j) of the change candidate relative to that of the search condition (index i) of the searched route. The function f calculates the evaluation value Wj by performing an operation, for example addition or subtraction, for using the goodness of fit Sij and the frequency T of the re-search. Also, when the evaluation value Wj is calculated, a goodness of fit Sj of the search condition (index j) of the change candidate may be used instead of the goodness of fit Sij.

The navigation processing unit 319 changes the search condition and selects the search condition after the change based on the evaluation value Wj. The navigation processing unit 319 changes the search condition when the evaluation value Wj of the search condition of the change candidate is larger than an evaluation value Wi of the search condition of the searched route. Also, the search condition may be changed when the proportion of the evaluation value Wj of the search condition of the change candidate relative to the evaluation value Wi of the search condition of the searched route is larger than a predetermined proportion (for example, "one") and when the evaluation value Wj of the search condition of the change candidate is larger than the threshold. In addition, when the search condition is changed, the search condition having the largest evaluation value Wj is selected, and the re-search is started in the selected search condition.

When this change processing operation is performed, the search condition which is mostly fit to the moving route is selected and the re-searched is performed in the selected search condition in a case where the user has selected and moved on the route different from the searched route. Also, the search condition is changed and the search condition after the change is selected with consideration of not only the goodness of fit of the search condition but also the frequency of the re-search. Therefore, a route search condition can be changed with consideration of the number of the passed junctions on the route which is different from the searched route and the like. That is, in a case where it has been estimated that the user obviously intends to move on the route different from the searched route, the route according to the intention of the user can be automatically guided. Also, since the frequency of the re-search is considered, the change of the search condition can be prevented when the user has selected the different route by mistake.

<3-3. Third Change Processing Operation of Search Condition>

In a third change processing operation of the search condition, the selection of the search condition will be described in a case where the evaluation value is calculated by using learning data U of the re-search and it is determined whether to change the search condition based on the evaluation value and the search condition is changed.

The learning data U is data about a change history of the search condition in the past. For example, the learning data U indicates the number of times of the re-search in the past on each road (including other users), the number of times of the changes of the search condition, the number of times of the re-search performed by the user in the past, and the like.

The navigation processing unit 319 calculates the evaluation value Wj according to the function f based on the formula (2) by using the goodness of fit S of the search condition, the frequency T of the re-search, and the learning data U.

$$Wj=f(Sij,T,Uij) \quad (2)$$

In the formula (2), the letter "i" is an index corresponding to the search condition of the searched route. The letter "j" is an index corresponding to the search condition of the change candidate. Also, a goodness of fit Sij indicates the proportion of the goodness of fit of the search condition (index j) of the change candidate relative to that of the search condition (index i) of the searched route. For example, the learning data Uij indicates the number of times of the re-search (including the user and other users) from the search condition (index i) in the past to the search condition (index j) on the road where the user passing through. The function f calculates the evaluation value Wj by performing an operation, for example addition or subtraction, for using the goodness of fit Sij, the frequency T of the re-search, and the learning data Uij. Also, when the evaluation value Wj is calculated, a goodness of fit Sj of the search condition (index j) of the change candidate may be used instead of the goodness of fit Sij.

The navigation processing unit 319 changes the search condition and selects the search condition after the change based on the evaluation value Wj. The navigation processing unit 319 changes the search condition when the evaluation value Wj of the search condition of the change candidate is larger than an evaluation value Wi of the search condition of the searched route. Also, the search condition may be changed when the proportion of the evaluation value Wj of the search condition of the change candidate relative to the evaluation value Wi of the search condition of the searched route is larger than a predetermined proportion (for example, "one") and when the evaluation value Wj of the search condition of the change candidate is larger than the threshold. In addition, when the search condition is changed, the search condition having the largest evaluation value Wj is selected, and the re-search is started in the selected search condition.

When this change processing operation is performed, the search condition which is mostly fit to the moving route is selected and the re-searched is performed in the selected search condition in a case where the user has selected and moved on the route different from the searched route. Also, the search condition is changed and the search condition after the change is selected with consideration of not only the goodness of fit of the search condition but also the frequency of the re-search. In addition, the search condition is changed and the search condition after the change is selected with consideration of the situation of the re-search in the past. Therefore, the route according to the intention of the user can be automatically guided with consideration of the search situation in the past at the time when the user has passed through the current position and the like. Also, since the frequency of the re-search and the learning data of the route are considered, the change of the search condition can be prevented in a case where the user has selected a different route by mistake. In addition, when the user has selected the similar route in the past, the route selected in the past can be guided.

<3-4. Other Change Processing Operation of Search Condition>

The change processing operation of the search condition is not limited to the above-mentioned first to third change processing operations, and the other change processing operation can be performed. For example, the navigation processing unit 319 may calculate the evaluation value Wj by using the goodness of fit S of the search condition and the learning data U, change the search condition, and select the search condition after the change based on the calculated evaluation value Wj.

Also, the navigation processing unit 319 re-searches for the route by adding the search condition relative to the searched route to the search condition according to the moving route. Then, the weight of the search condition according to the moving route may be sequentially increased according to that the user continues to move on the route searched in the search condition according to the moving route. For example, the evaluation value Wi of the search condition of the searched route and the evaluation value Wj of the search condition of the change candidate are weighted. The route is re-searched by using an additional value, in which the value after the weighting is added, as the evaluation value.

In addition, at the time of the weighting, the weight of the search condition according to the moving route may be sequentially increased in accordance with that the user continues to move on the searched route in the search condition according to the moving route. For example, with the movement of the user, the weight of the search condition corresponding to the road where the user is moving is sequentially increased. This enables the search condition corresponding to the road where the user is moving to become likely to be selected. With this weighting, when the user selects and moves on the route having the characteristics of the back road priority in a case where the search condition of the searched route is "main road priority", the determination as to whether to change the search condition and the like is performed based on the additional value of the evaluation value of the search condition of "main road priority" and "back road priority". Here, when the user has continued to move on the route having characteristics of "back road priority", the weight relative to the evaluation value of the search condition of "back road priority" is increased. Therefore, the search condition corresponding to the road where the user is moving becomes likely to be selected. Therefore, the route according to the intention of the user can be automatically guided.

Also, when the transportation mode is automatically determined and it is assumed that the search condition according to the transportation mode determined at the time of re-search is the change candidate, the route according to the intention and the transportation mode of the user can be guided. For example, when an acceleration sensor, a gyro sensor, and the like are provided in the information processor 20, the transportation mode is determined by analyzing behavior based on sensor signals generated by these sensors and identifying the transportation mode based on the analysis result. Also, the transportation mode may be determined by using the speed calculated by the speed calculation unit 312 and the like. For example, it is determined which one of the automobile, the bicycle, the walk, and the like is the transportation mode based on the speed, the acceleration, and the like.

In addition, the above-mentioned series of processing described herein can be performed by hardware, software, or a composite structure of the hardware and the software. When the processing is performed by the software, a program in which a processing sequence has been recorded is installed in a memory, which is built in a dedicated hardware, in a computer and executed. Also, the program can be installed in a general-purpose computer capable of performing various processing and executed.

For example, the program can be previously recorded in the hard disk and the read only memory (ROM) as recording media. Also, the program can be temporarily or permanently stored (recorded) in a removable recording media such as a flexible disk, a compact disc read only memory (CD-ROM), a magneto optical (MO) disk, a digital versatile disc (DVD), a Blu-ray Disc (BD (registered trademark)), a magnetic disk, and a semiconductor memory card. These removable recording media can be provided as a so-called package software.

Also, the program may be installed from the removable recording media to the computer and may be transferred from a download site to the computer by a wired or wireless channel via a network such as a local area network (LAN) and the internet. The computer can receive the program transferred in this way and install the program in the recording media such as the built-in hard disk.

Also, the present technique should not be limited to the above-mentioned embodiments of the technique and interpreted. The embodiments of the technique disclose the present technique informs of examples, and it is obvious that those skilled in the art can amend and substitute the embodiments without departing from the scope of the present technique. That is, claims should be considered in order to determine the scope of the present technique.

The information processor of the present technique can have a configuration below.

(1) An information processor including:
  a route search unit configured to search for a route to a destination point by using network information in which information on the route in a case where a user moves from a point to another point has been indicated; and
  a position obtaining unit configured to obtain a current position, wherein
  the route search unit re-searches for the route in a search condition according to a moving route when the moving route based on a position obtained by the position obtaining unit is different from a searched route and another route is re-searched.

(2) The information processor according to (1), wherein the route search unit calculates an evaluation value regarding the moving route for each search condition which has been previously provided and determines the search condition according to the moving route based on the calculated evaluation value.

(3) The information processor according to (2), wherein the route search unit calculates the evaluation value based on a goodness of fit of the search condition relative to the moving route.

(4) The information processor according to (3), wherein the route search unit calculates the evaluation value based on a goodness of fit of the search condition relative to the searched route and the goodness of fit of the search condition which has been previously provided relative to the moving route.

(5) The information processor according to (3) or (4), wherein
the route search unit calculates the evaluation value by further using a frequency of re-search or learning data of re-search.

(6) The information processor according to any one of (1) to (5), wherein
the route search unit re-searches for the route by adding the search condition relative to the searched route to the search condition according to the moving route and re-searches for the route by sequentially increasing weight of the search condition according to the moving route according to that the user continues to move on the route searched in the search condition according to the moving route.

(7) The information processor according to any one of (1) to (6), wherein
the route search unit determines whether it is necessary to change the search condition by using the evaluation value calculated for the search condition relative to the searched route and the evaluation value calculated for the search condition having been previously provided relative to the moving route or by using the frequency of the re-search, and the route search unit re-searches for the route in the search condition according to the moving route when it has been determined that it is necessary to change the search condition.

INDUSTRIAL APPLICABILITY

The information processor, the information processing method, and the program of the technique searches for the route to the destination point by using the network information in which the information on the route in a case where the user moves from a point to another point has been indicated. Also, when the moving route is different from the searched route and the route is re-searched, the route is re-searched in a search condition according to the moving route. Therefore, since the re-search is performed in the search condition according to the route that the user intends when the user has consciously moved on the route different from the guided route, the route according to the intention of the user can be automatically guided. Accordingly, the technique is suitable for an electronic device having a navigation function, for example, a car navigation apparatus, a mobile phone, and a portable terminal apparatus.

REFERENCE SIGNS LIST 20 information processor
21 Z-axis gyro sensor
22 Y-axis gyro sensor
23 triaxial acceleration sensor
24 geomagnetic sensor
25 air pressure sensor
28 antenna
31 navigation unit
41 display unit
42 storage unit
43 voice output unit
44 user interface unit
45 control unit
49 bus
311 angle calculation unit
312 speed calculation unit
313 positional change calculation processing unit
314 attitude angle detection unit
315 azimuth calculation unit
316 positioning signal processing unit
317 altitude calculation unit
319 navigation processing unit

The invention claimed is:
1. An information processor, comprising:
a route search unit configured to search for a first route based on network information, wherein the first route is from a start point to a destination point,
wherein the network information comprises information on a searched route associated with a user of the information processor, and wherein the user of the information processor moves from the start point to the destination point; and
a position obtaining unit configured to obtain, from one or more position sensors, a current position of the information processor, and determine a moving route that indicates a movement of the user based on the current position of the information processor,
wherein the route search unit is further configured to:
change, based on a number of times a second route different from the first route was re-searched in past by the user of the information processor, a search condition,
change, for the second route, the search condition based on a number of times the second route was re-searched by a plurality of users in the past, and
re-search for the second route based on the changed search condition and a determination that the moving route is different from the searched route.

2. The information processor according to claim 1, wherein the route search unit is further configured to:
calculate an evaluation value related to the moving route for each search condition of a plurality of search conditions, wherein the plurality of search conditions are associated with previously used moving routes; and
determine the search condition for the moving route based on the calculated evaluation value.

3. The information processor according to claim 2, wherein the route search unit is further configured to calculate the evaluation value based on a goodness of fit of the search condition relative to the moving route.

4. The information processor according to claim 3, wherein the route search unit is further configured to calculate the evaluation value based on a goodness of fit of the search condition of the plurality of search conditions relative to the searched route and the goodness of fit of each search condition of the plurality of search conditions used previously relative to the moving route.

5. The information processor according to claim 2, wherein the route search unit is further configured to change the search condition based on:
the evaluation value calculated for the search condition corresponding to the searched route and the evaluation value calculated for the search condition corresponding to the moving route that is used previously, or
a frequency of re-search.

6. The information processor according to claim 3, wherein the route search unit is further configured to calculate the evaluation value based on a frequency of re-search.

7. The information processor according to claim 1, wherein the route search unit is further configured to:
re-search for the second route by addition of a first search condition corresponding to the searched route and a second search condition corresponding to the moving route, and
sequentially increase a weight of the search condition based on the moving route as the user continues to move on the moving route.

8. The information processor according to claim 1, wherein the information processor is configured to determine that the moving route is different from the searched route based on the user that has passed through a junction of roads.

9. An information processing method, comprising:
in an information processor:
searching for a first route based on network information, wherein the first route is from a start point to a destination point,
wherein the network information comprising information on a searched route associated with a user of the information processor, wherein the user of the information processor moves from the start point to the destination point;
obtaining, from one or more position sensors, a current position of the information processor, and determining a moving route that indicates a movement of the user based on the current position of the information processor;
changing, based on a number of times a second route different from the first route was re-searched in past by the user of the information processor, a search condition,
changing, for the second route, the search condition based on a number of times the second route was re-searched by a plurality of users in the past; and
re-searching for the second route based on the changed search condition and a determination that the moving route is different from the searched route.

10. A non-transitory computer-readable medium having stored thereon, computer-executable instructions which when executed by an information processor, cause the information processor to execute operations, the operations comprising:
searching for a first route based on network information, wherein the first route is from a start point to a destination point,
wherein the network information comprising information on a searched route associated with a user of the information processor, wherein the user of the information processor moves from the start point to the destination point;
obtaining, from one or more position sensors, a current position of the information processor, and determining a moving route that indicates a movement of the user based on the current position of the information processor;
changing, based on a number of times a second route different from the first route was re-searched in past by the user of the information processor, a search condition,
changing for the second route, the search condition based on a number of times the second route was re-searched by a plurality of users in the past; and
re-searching for the second route based on the changed search condition and a determination that the moving route is different from the searched route.

* * * * *